United States Patent
Roh et al.

(10) Patent No.: US 7,733,971 B2
(45) Date of Patent: Jun. 8, 2010

(54) APPARATUS AND METHOD FOR RECOVERING FREQUENCY IN AN ORTHOGONAL FREQUENCY DIVISION MULTIPLEXING SYSTEM

(75) Inventors: Hee-Jin Roh, Suwon-si (KR); Su-Jin Yoon, Suwon-si (KR); Min-Goo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 860 days.

(21) Appl. No.: 11/606,353

(22) Filed: Nov. 30, 2006

(65) Prior Publication Data
US 2007/0133699 A1 Jun. 14, 2007

(30) Foreign Application Priority Data
Nov. 30, 2005 (KR) .................. 10-2005-0116041

(51) Int. Cl.
*H04K 1/10* (2006.01)
(52) U.S. Cl. .................. 375/260; 375/259; 370/206; 370/503
(58) Field of Classification Search .................. 375/260
See application file for complete search history.

(56) References Cited
U.S. PATENT DOCUMENTS 5,949,796 A * 9/1999 Kumar .................. 370/529
7,092,881 B1 * 8/2006 Aguilar et al. .............. 704/233
2004/0146003 A1 * 7/2004 Schaefer et al. ............. 370/206
2006/0067430 A1 * 3/2006 Wu et al. ..................... 375/322
2007/0184789 A1 * 8/2007 Ben-Ayun et al. ........... 455/126

* cited by examiner

*Primary Examiner*—Shuwang Liu
*Assistant Examiner*—Michael R Neff
(74) *Attorney, Agent, or Firm*—Roylance, Abrams, Berdo & Goodman, LLP

(57) ABSTRACT

An apparatus and method for recovering a carrier frequency of a received signal using a predefined symbol in an OFDM system is provided. A maximum value detector detects at least three values and their corresponding offsets in descending order among auto-correlation values calculated within a specific frequency offset range between a received signal and a predefined symbol. A frequency offset corrector compares a ratio of a first auto-correlation value to a second auto-correlation value with a predetermined first threshold, determines whether first and second frequency offsets corresponding to the first and second auto-correlation values are adjacent to each other if the ratio of the auto-correlation values is less than the first threshold, and determines an initial carrier frequency offset using a difference between the first frequency offset and a frequency offset correction value determined according to system, if the first and second frequency offsets are adjacent to each other and a ratio of the second auto-correlation value and a third auto-correlation value is greater than a predetermined second threshold.

16 Claims, 9 Drawing Sheets

APPARATUS AND METHOD FOR RECOVERING FREQUENCY IN AN ORTHOGONAL FREQUENCY DIVISION MULTIPLEXING SYSTEM

CROSS-REFERENCE TO RELATED APPLICATIONS

This application claims the benefit under 35 U.S.C.§119(a) of a Patent Application filed in the Korean Intellectual Property Office on Nov. 30, 2005 and assigned Ser. No. 2005-116041, the entire disclosure of which is hereby incorporated by reference.

BACKGROUND OF THE INVENTION

1. Field of the Invention:

The present invention relates generally to an Orthogonal Frequency Division Multiplexing (OFDM) system. More particularly, the present invention relates to a method and apparatus for recovering a carrier frequency offset in a receiver of an OFDM system.

2. Description of the Related Art

An OFDM transmission scheme is a type of multi-carrier modulation scheme. This technology has been attracting attention along with the development of Very Large Scale Integration (VLSI) technology since the early 1990s. The OFDM transmission scheme is characterized by parallel-transmitting data on subcarriers that maintain mutual orthogonality. A general OFDM receiver 100 may be simply realized using Fast Fourier Transform (FFT) as illustrated in FIG. 1. The OFDM scheme, compared with a single-carrier modulation scheme, may efficiently use the transmission band, so it is popularly applied to the broadband transmission scheme.

In terms of the reception characteristic, the OFDM transmission scheme illustrates the robust characteristic against a frequency selective multipath fading channel, compared with the single-carrier modulation scheme. An input signal of the receiver may be a frequency selective channel in the band occupied by a plurality of subcarriers and it may also be a frequency nonselective channel in each subcarrier band. Therefore, the input signal can be easily channel-compensated through a simple channel equalization process. In particular, the OFDM scheme generates a cyclic prefix (CP) by copying a rear part of each OFDM symbol and transmits the CP in front of the corresponding OFDM symbol, thereby removing inter-symbol interference (ISI) from a previous symbol. The OFDM transmission scheme is suitable for broadband high-speed communication as a result of its robust characteristic against multipath fading.

In the digital broadcast standard, the OFDM transmission scheme has attracted attention as a transmission technique capable of guaranteeing high reception quality and high-speed transmission/reception. Digital Audio Broadcasting (DAB) for European wireless radio broadcasting and Digital Video Broadcasting-Terrestrial (DVB-T) which is the terrestrial High Density Television (HDTV) standard are examples of the broadcast standard using the OFDM transmission scheme. Recently, the development of mobile broadcast systems is under way all over the world along with the mainstream of communication-broadcasting convergence. The main object is to transmit high-capacity multimedia information in the mobile channel environment. While Europe has established Digital Video Broadcasting-Handheld (DVB-H) developed from DVB-T as the European mobile broadcast standard, South Korea has established Terrestrial Digital Multimedia Broadcasting (DMB) developed from DAB as the broadcast standard. Even the European DVB-H is officially recognized as another standard of the domestic Terrestrial DMB, and MediaFLO proposed by the Qualcomm, USA and the Japanese ISDB-T system are also based on the OFDM transmission scheme.

A synchronization algorithm of the OFDM system is roughly classified into a carrier frequency synchronization algorithm and a symbol-timing synchronization algorithm. The carrier frequency synchronization algorithm corrects a carrier frequency offset between a transmitter and a receiver. The carrier frequency offset generally occurs because of a difference in oscillator frequency between the transmitter and the receiver, and a Doppler effect due to movement of the receiver. A Carrier Frequency Offset (CFO) of a signal input to the receiver can be greater than subcarrier spacing. A process of correcting an Integer Frequency Offset (IFO) corresponding to an integer multiple of the subcarrier spacing is defined as initial carrier frequency synchronization, and a process of correcting a Fractional Frequency Offset (FFO) corresponding to a fractional multiple of the subcarrier spacing is defined as fine carrier frequency synchronization. The fine carrier frequency synchronization is also defined as a step of correcting the residual frequency offset after the initial carrier frequency synchronization.

Because the offset IFO corresponding to an integer multiple of the carrier shifts a transmitted OFDM signal by an integer multiple of a subcarrier in a frequency domain, it serves to shift an FFT output sequence by the integer multiple. Alternatively, the offset FFO corresponding to a fractional multiple of the subcarrier causes interference between FFT outputs, thereby causing considerable bit error rate (BER) performance degradation. The OFDM system, compared with the single-carrier transmission system, is higher in the performance degradation due to the carrier frequency offset.

The conventional initial carrier frequency synchronization algorithm that estimates IFO can be divided into a blind detection scheme and a scheme using predefined (or previously engaged) symbols. As an example of the blind detection scheme, there is an algorithm that uses a scheme of estimating a shift of a signal band using a guard band. However, because this algorithm illustrates considerable performance degradation in the multipath fading channel environment, it is hard to actually implement the algorithm. Alternatively, the scheme using the predefined symbols transmits predefined symbols separately from data symbols, thereby causing a decrease in data rate. However, because this scheme improves synchronization and channel estimation performance, it is substantially applied to most OFDM systems.

In the OFDM system, an initial carrier frequency recovery apparatus using predefined symbols in the frequency domain can generally be divided into a structure 200 for correcting a frequency offset in a digital domain as illustrated in FIG. 2A, and a structure 220 for correcting a frequency offset in an analog domain as illustrated in FIG. 2B. OFDM signals received via an antenna are converted into baseband signals by radio frequency (RF) receivers 201 and 221, and then converted into digital-domain signals by Analog-to-Digital Converters (ADC) 203 and 223. Thereafter, the digital-domain signals are converted into frequency-domain signals by Fast Fourier Transformers (FFTs) 207 and 225. Frequency offset estimators 209 and 227 estimate frequency offset values using characteristics of predefined symbols and then correct the estimated frequency offset values.

The predefined symbols transmitted for synchronization and channel estimation of the receiver are generally composed of a pseudo-random nose (PN) sequence and a sequence capable of using an auto-correlation characteristic. According to the auto-correlation characteristic, an auto-correlation value illustrates the maximum value when there is no code offset between a sequence transmitted at an input predefined symbol and a sequence locally generated in the receiver, and the auto-correlation value decreases when there is the code offset.

FIG. 3 is a diagram illustrating frequency estimation performance in the conventional frequency offset estimation process. Specifically, FIG. 3 illustrates IFO detection error probability with respect to Signal-to-Noise Ratio (SNR). Herein, the horizontal axis represents SNR, and the vertical axis represents IFO detection error probability. In addition, ΔFc denotes a frequency offset. In the following description, IFO and FFO will be used as a carrier frequency offset corresponding to an integer multiple and a carrier frequency offset corresponding to a fractional multiple, respectively, both normalized at subcarrier spacing.

As illustrated in FIG. 3, as FFO approaches 0.5, IFO detection error probability increases abruptly, and if FFO is 0.5, the IFO detection error probability converges at ½ as illustrated by a circle 301. Therefore, even though the fine carrier frequency recovery process is performed, the finally estimated frequency offset value may have a difference corresponding to the subcarrier spacing.

In addition, because the fine carrier frequency recovery process generally uses a phase detector whose pull-in range is −0.5~0.5 (unit: subcarrier spacing), if FFO is in the vicinity of 0.5, a hang-up phenomenon occurs. The hang-up phenomenon causes an increase in the convergence time. If a sine-type phase detector's characteristic curve is used, an increase in the convergence time due to the hang-up phenomenon is more considerable.

Accordingly, there is a need for an improved apparatus and method for improving carrier frequency estimation performance in an OFDM system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention to provide a frequency recovery apparatus and method for improving carrier frequency estimation performance in an OFDM system.

According to another object of an exemplary embodiment of the present invention, a frequency recovery apparatus and method for reducing a convergence time of a fine carrier frequency recoverer by adaptively correcting an estimated initial carrier frequency offset value is provided.

It is further another object of an exemplary embodiment of the present invention to provide a frequency recovery apparatus and method for improving carrier frequency estimation performance with low hardware complexity in a receiver of an OFDM system.

According to one aspect of an exemplary embodiment of the present invention, a method for recovering a carrier frequency of a received signal is provided. A predefined symbol in an orthogonal frequency division multiplexing (OFDM) system is used. At least three values and their corresponding offsets are detected in descending order among auto-correlation values calculated within a specific frequency offset range between a received signal and a predefined symbol. A ratio of a first auto-correlation value to a second auto-correlation value with a predetermined first threshold is computed. If the ratio of the auto-correlation values is less than the first threshold, a determination is made as to whether first and second frequency offsets corresponding to the first and second auto-correlation values are adjacent to each other. An initial carrier frequency offset is determined by using a difference between the first frequency offset and a frequency offset correction value determined according to system, if the first and second frequency offsets are adjacent to each other and a ratio of the second auto-correlation value and a third auto-correlation value is greater than a predetermined second threshold. The first to third auto-correlation values represent the calculated auto-correlation values in descending order.

Initial carrier synchronization is performed using the initial carrier frequency offset, and then fine carrier frequency synchronization is performed using a residual carrier frequency offset.

The first frequency offset is determined as an initial carrier frequency offset, if the ratio of the first auto-correlation value to the second auto-correlation value is greater than the first threshold.

An initial carrier frequency process is re-performed if the first and second frequency offsets are not adjacent to each other.

An initial carrier frequency process is re-performed if the ratio of the second auto-correlation value to the third auto-correlation value is less than the second threshold.

According to another aspect of an exemplary embodiment of the present invention, an apparatus for recovering a carrier frequency of a received signal using a predefined symbol in an orthogonal frequency division multiplexing (OFDM) system is provided. The apparatus includes a maximum value detector and a frequency offset corrector. The maximum value detector detects at least three values and their corresponding offsets in descending order among auto-correlation values calculated within a specific frequency offset range between a received signal and a predefined symbol. The frequency offset corrector compares a ratio of a first auto-correlation value to a second auto-correlation value with a predetermined first threshold. A determination is made as to whether first and second frequency offsets corresponding to the first and second auto-correlation values are adjacent to each other if the ratio of the auto-correlation values is less than the first threshold. An initial carrier frequency offset is determined by using a difference between the first frequency offset and a frequency offset correction value determined according to the system, if the first and second frequency offsets are adjacent to each other and a ratio of the second auto-correlation value and a third auto-correlation value is greater than a predetermined second threshold. The first to third auto-correlation values represent the calculated auto-correlation values in descending order.

The frequency offset corrector determines the first frequency offset as an initial carrier frequency offset, if the ratio of the first auto-correlation value to the second auto-correlation value is greater than the first threshold.

The frequency offset corrector re-performs an initial carrier frequency process if the first and second frequency offsets are not adjacent to each other.

The frequency offset corrector re-performs an initial carrier frequency process if the ratio of the second auto-correlation value to the third auto-correlation value is less than the second threshold.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention provides an apparatus and method for efficiently recovering a frequency in an OFDM system. A carrier frequency recovery apparatus and method will be described according to an exemplary embodiment of the present invention.

A carrier frequency recovery algorithm, according to an exemplary embodiment of the present invention, will now be described in brief. Based on an auto-correlation level value calculated in an initial carrier frequency synchronization process, the carrier frequency recovery algorithm receives at least 3 maximum values and compares the levels with each other. This facilitates the estimation and correction of the IFO. The carrier frequency recovery algorithm detects the case where FFO is in the vicinity of 0.5, and additionally corrects a part of the FFO.

Figure 1:
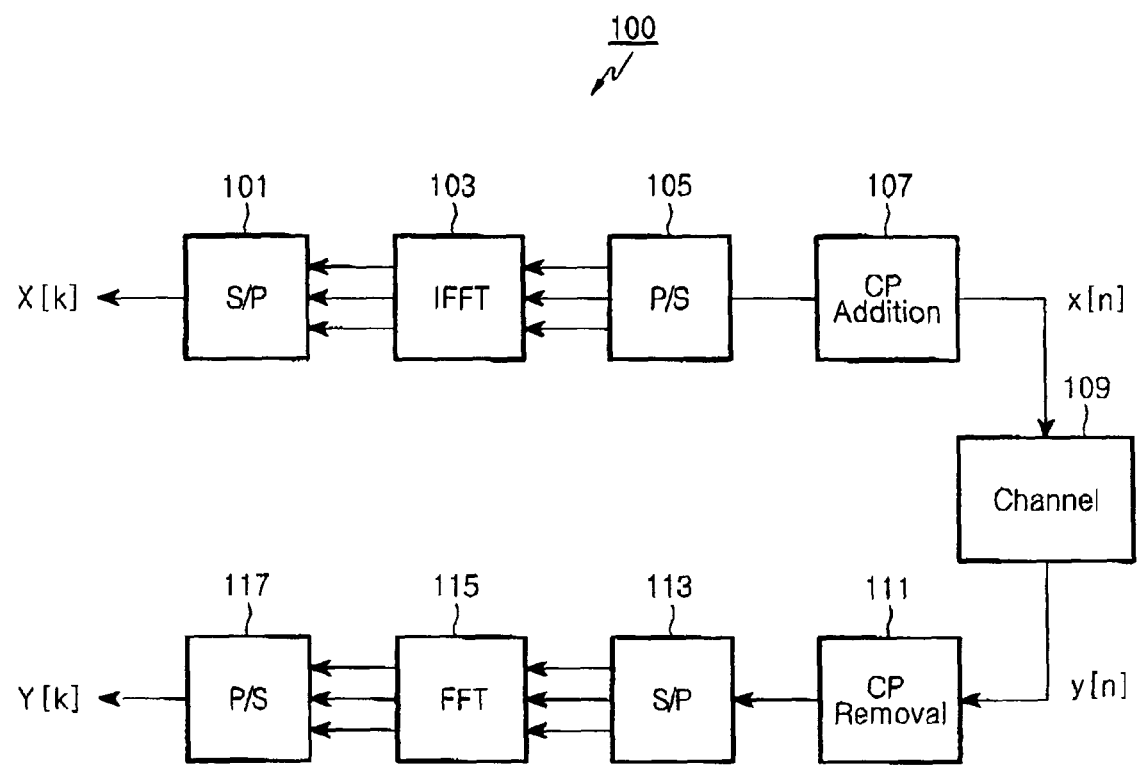
FIG. 1 is a block diagram illustrating a general OFDM receiver.
Figure 2A:
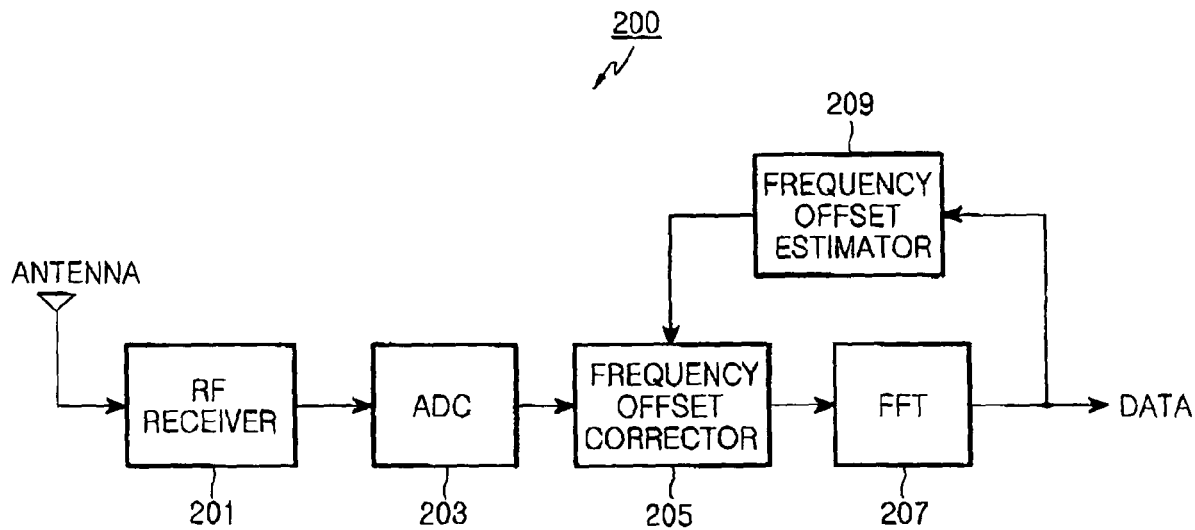
FIGS. 2A and 2B are block diagrams illustrating conventional apparatuses for correcting a frequency offset.
Figure 2B:
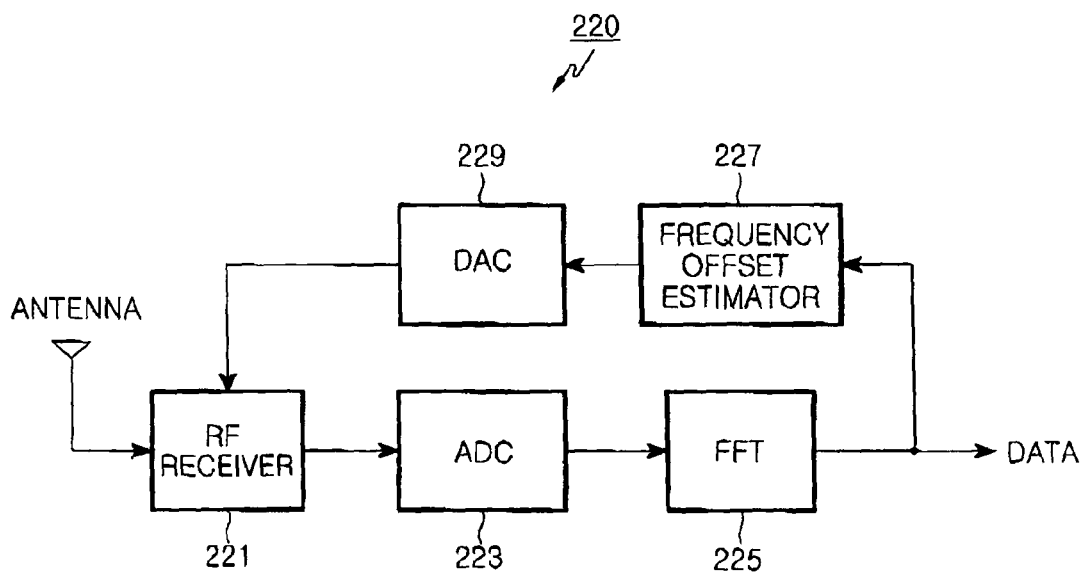
Figure 3:
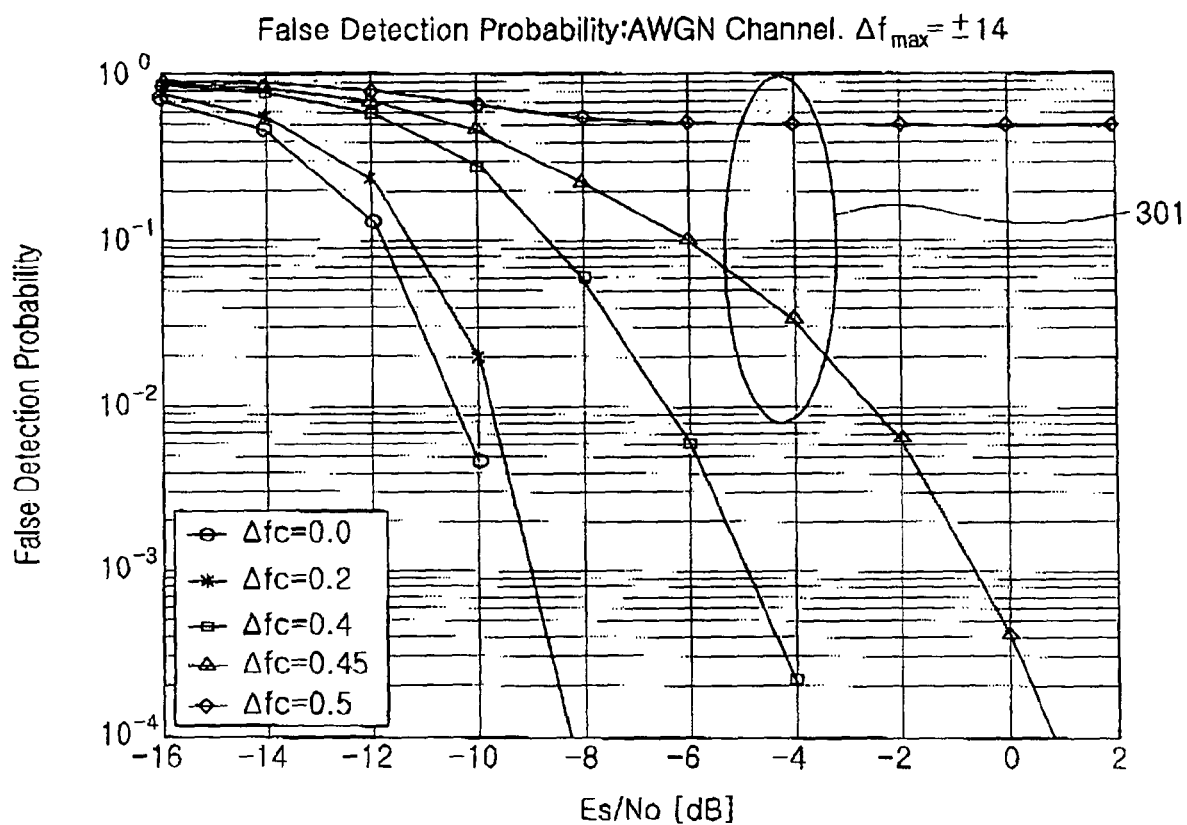
FIG. 3 is a graph illustrating frequency estimation performance in the conventional frequency offset estimation process.
Figure 4A:
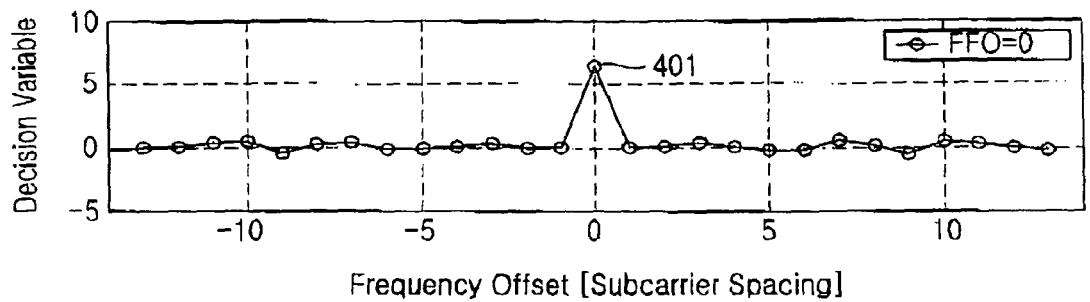
FIGS. 4A to 4C are diagrams illustrating auto-correlation characteristics of predefined symbols for FFO according to an exemplary embodiment of the present invention.

In order to correct a carrier frequency offset, it is necessary to calculate an auto-correlation value of a PN sequence with a predefined symbol. According to an exemplary implementation, an auto-correlation value of a PN sequence with a predefined symbol will be described in brief with reference to FIGS. 4A to 4C. FIG. 4A illustrates an auto-correlation characteristic of a predefined symbol while changing a carrier frequency offset FFO corresponding to a fractional multiple of subcarrier spacing after fixing IFO corresponding to an integer multiple of subcarrier spacing.

Figure 4B:
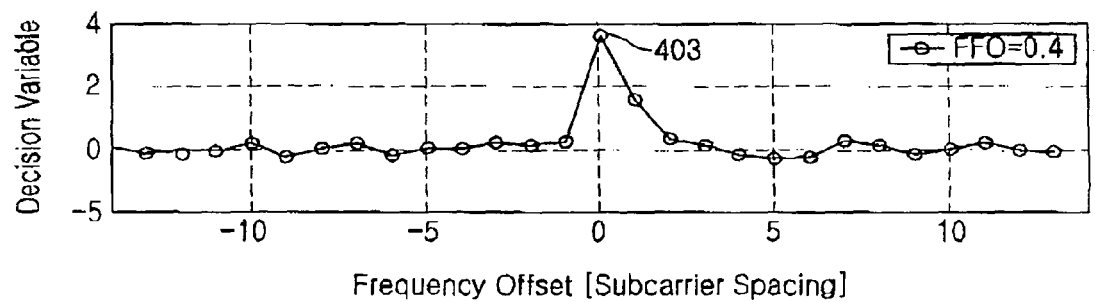
Figure 4C:
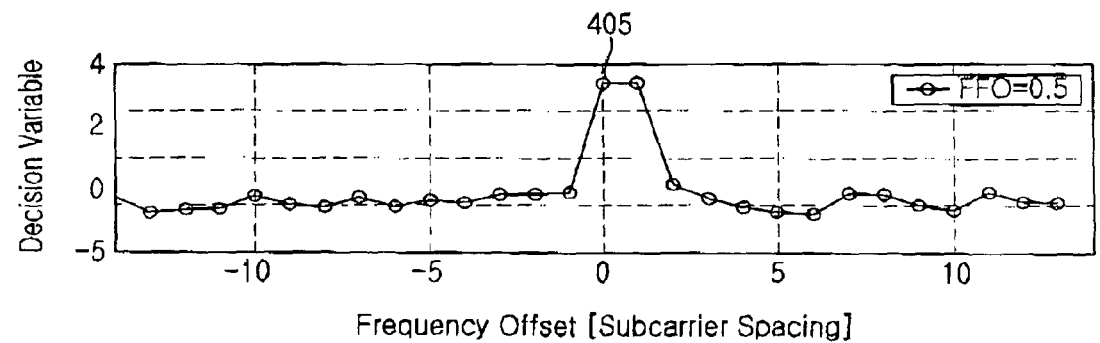

It can be noted from FIG. 4A that for FFO to be 0, the auto-correlation level has the maximum value. FIGS. 4B and 4C illustrate graphs in which FFO=0.4 and 0.5, respectively. It can be noted that as FFO approaches 0.5, the maximum values 401 to 405 of the auto-correlation levels decrease and auto-correlation values at the adjacent subcarriers increase.

Figure 6A:
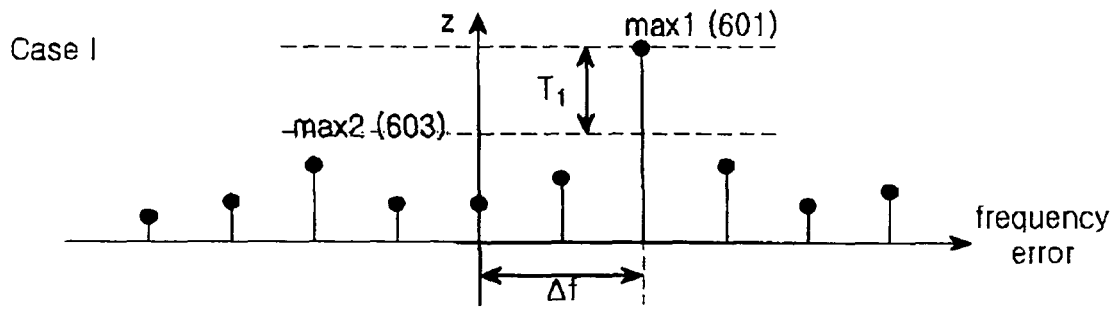
FIGS. 6A to 6C are diagrams illustrating auto-correlation characteristics for FFO depending on estimated carrier frequency offsets according to an exemplary embodiment of the present invention.
Figure 6B:
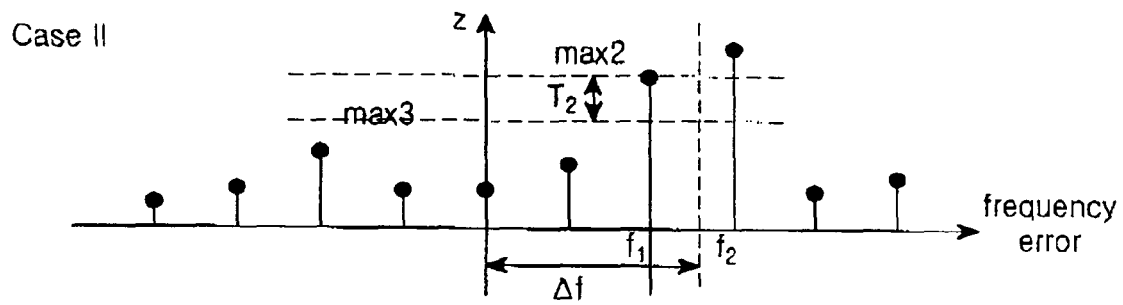
Figure 6C:
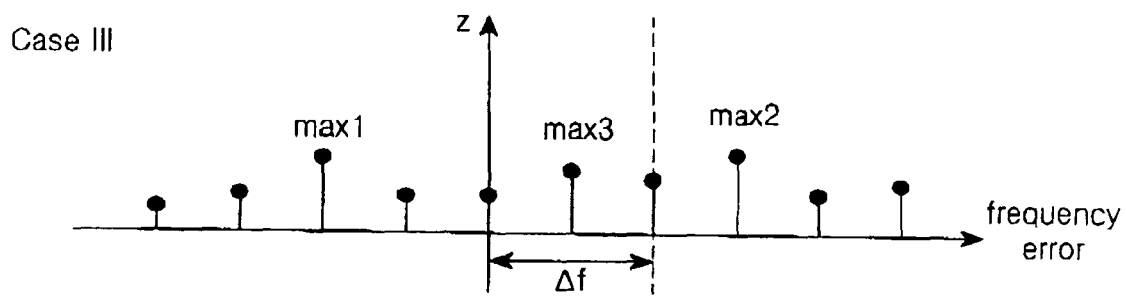

As illustrated in FIGS. 6A to 6C, auto-correlation characteristics that can appear for an estimated carrier frequency offset value can be roughly classified into 3 types. Herein, the horizontal axis represents a frequency error value and the vertical axis represents an auto-correlation value.

Case I of FIG. 6A represents the case in which an auto-correlation value has a maximum value (Max1) 601 at one estimated carrier frequency offset value 607 and a difference with a second greatest auto-correlation value (Max2) 603 is large. Such a case can generally occur for low FFO, and in this case, it can be considered that a short fine carrier frequency synchronization time is required.

Case II of FIG. 6B represents the case in which an auto-correlation value has the maximum values at two consecutive estimated carrier frequency offset values f1 and f2, and a difference with another auto-correlation value is large. Such a case can generally occur when an FFO level is in the vicinity of 0.5, and in this case, it can be considered that a fine carrier frequency synchronization time increases. Therefore, by detecting Case II, an exemplary embodiment of the present invention performs frequency offset correction so as to improve fine carrier frequency synchronization performance and reduce the convergence time.

Finally, Case III of FIG. 6C represents the case where auto-correlation values at all estimated carrier frequency offset values are similar to each other. In this case, it can be considered that the auto-correlation is performed in a low-SNR environment or in a position of an OFDM symbol where predefined symbols are not transmitted.

Figure 5:
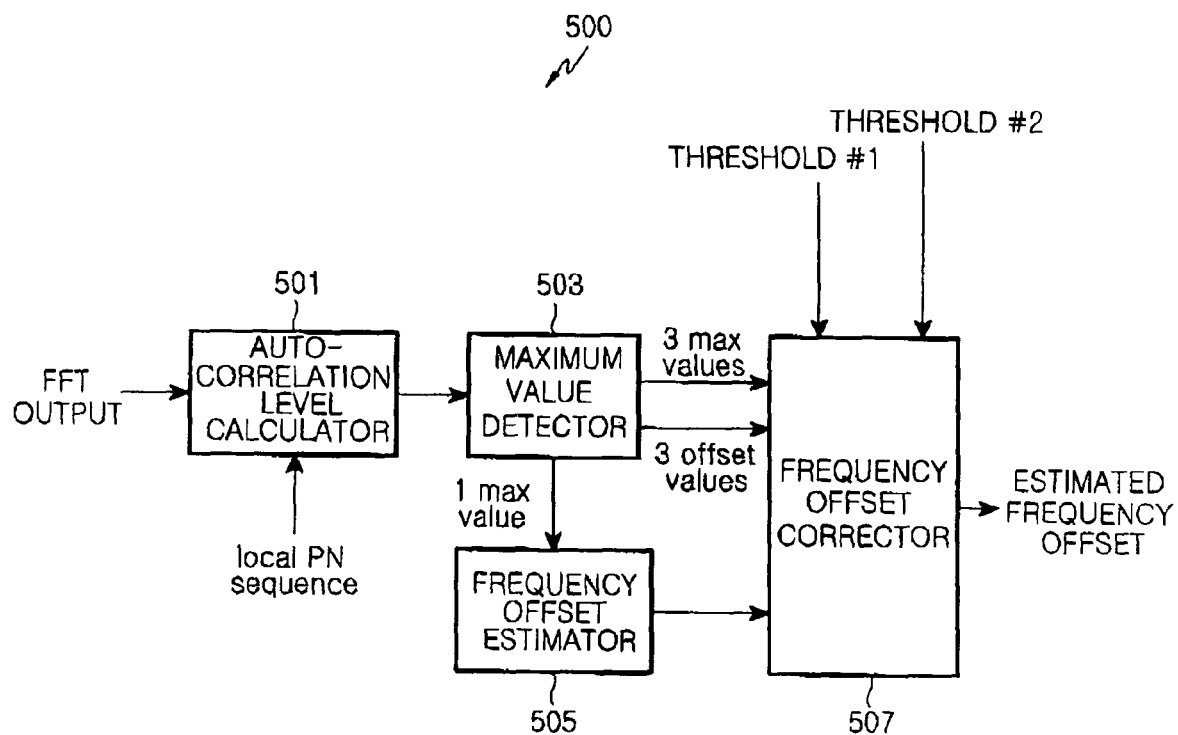
FIG. 5 is a block diagram illustrating a frequency recovery apparatus in an OFDM system according to an exemplary embodiment of the present invention.

FIG. 5 is a block diagram illustrating a frequency recovery apparatus 500 in an OFDM system according to an exemplary embodiment of the present invention. Referring to FIG. 5, the frequency recovery apparatus 500 includes an auto-correlation level calculator 501, a maximum value detector 503, a frequency offset estimator 505, and a frequency offset corrector 507.

The auto-correlation level calculator 501 receives an FFT output signal in a position of a predefined symbol, and calculates an auto-correlation value with a generally located PN sequence.

The maximum value detector 503 detects a maximum value and at least 3 associated offset values to distinguish the cases described in FIGS. 6A to 6C, and provides the detected values to the frequency offset corrector 507. The maximum value detector 503 provides the greatest maximum value Max1 among the maximum values to the frequency offset estimator 505, thereby first estimating a frequency offset for IFO.

A description will now be made of a method for detecting the maximum value and its associated frequency offset values in the maximum value detector 503 and the frequency offset estimator 505. In an initial carrier frequency offset process, if a carrier frequency offset occurs, a received PN sequence at an FFT output is shifted in the frequency domain by the frequency offset, so the amount of shift is estimated. The fact that the auto-correlation value is maximized in the position corresponding to the amount of shift facilitates the operation of this method. The frequency offset can be estimated using Equation (1) below.

$$Z(f_n) = \left| \sum_k Y[k] p * [k - f_n] \right|^m \qquad (1)$$

According to an exemplary implementation, Y[k] denotes an FFT output received at a $k^{th}$ subcarrier, p[k] denotes a PN sequence value for a $k^{th}$ subcarrier, and $f_n$ denotes a carrier frequency offset corresponding to an integer multiple of subcarrier spacing, to be estimated. $Z(f_n)$ is a scale indicating a level of an auto-correlation value, and a value of m is an integer greater than 0. Therefore, the finally estimated frequency offset is defined as a code offset where $Z(f_n)$ is maximized, and can be written as Equation (2).

$$\hat{f}_n = \arg = \left[ \max_{f_n} [Z(f_n)] \right] \qquad (2)$$

The maximum value detector 503 detects the second greatest maximum value Max2 and the third greatest maximum value Max3 together with the first greatest maximum value Max1 among the Z(fn) defined by Equation (1). The maximum value detector 503 also detects a frequency offset value corresponding to each case in accordance with Equation (2).

The frequency offset corrector 507 receives the 3 maximum values provided from the maximum value detector 503 and the corresponding offset values, and distinguishes the cases proposed in the exemplary embodiments of present invention using the received values. Thereafter, the frequency offset corrector 507 corrects a part of the FFO according to the distinguished cases in addition to the estimated IFO. A frequency recovery method according to an exemplary embodiment of the present invention will now be described with reference to FIG. 7.

Figure 7:
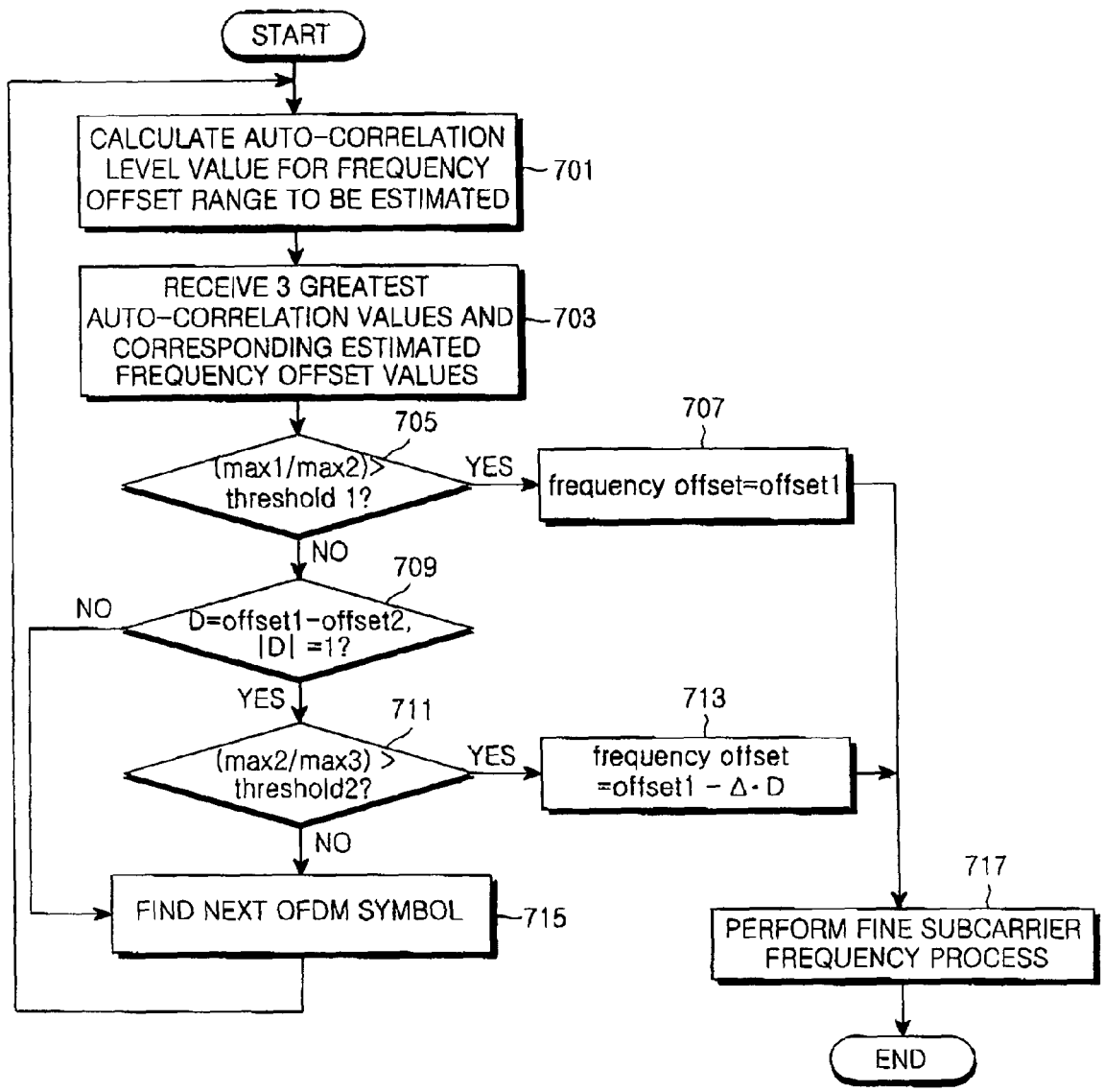
FIG. 7 is a flowchart illustrating a frequency recovery method according to an exemplary embodiment of the present invention.

FIG. 7 is a flowchart illustrating a method for recovering a frequency in a frequency recovery apparatus 500 according to an exemplary embodiment of the present invention. Referring to FIG. 7, an auto-correlation level calculator 501 in the frequency recovery apparatus 500 calculates in step 701 an auto-correlation level value for a carrier frequency offset range desired to be estimated in accordance with Equation (1), using a received FFT output value in a position of a predefined symbol. In step 703, a maximum value detector 503 detects the 3 greatest maximum values from the input auto-correlation value $Z(f_n)$, and the then-estimated frequency offset values. Herein, the greatest auto-correlation level value is defined as Max1, the second greatest auto-correlation level value is defined as Max2, the third greatest auto-correlation level value is defined as Max3, and the then-estimated frequency offset values are Offset1, Offset2 and Offset3, respectively.

Thereafter, in order to distinguish the cases other than Case I among the cases classified according to an exemplary embodiment of the present invention, the frequency offset corrector 507 receiving the Max1, Max2 and Max3 calculates in step 705 a ratio u of the Max1 to the Max2 in accordance with Equation (3) and determines whether the ratio u is greater than a predetermined first threshold.

$$u = \frac{\max 1}{\max 2} \qquad (3)$$

According to an exemplary implementation, the first threshold indicates T1 605 of FIG. 6A. If the value u is greater than the T1 605, the frequency offset corrector 507 determines that the corresponding case is Case I. If a determination is made in step 705 that the corresponding case is Case I (the FFO value is small), the frequency offset corrector 507 sets a frequency offset value for IFO to Offset1 in step 707 indicative of a frequency offset value of Equation (2), and proceeds to step 717 where it performs an initial carrier frequency process using the Offset1 value.

However, if the value u is less than the first threshold T1 605 in step 705, the frequency offset corrector 507 determines whether a difference D between Offset1 and Offset2 is equal to '1' in step 709, in order to distinguish Case II and Case III.

The value D can be expressed as $$D = \arg \left[ \max_{f_n} [Z(f_n)] \right] - \arg \left[ \max_{f_n} [Z(f_n)] \right] \qquad (4)$$

Herein, $\max_1[x_n]$ denotes an $i^{th}$ greatest value among $x_n$, and $$\arg \left[ \max_{f_n} [Z(f_n)] \right] \text{ and } \arg \left[ \max_{f_n} [Z(f_n)] \right]$$

denote Offset1 and Offset2, respectively.

If the value D is not equal to '1' in step 709, the frequency offset corrector 507 determines that the corresponding case is Case III. According to an exemplary implementation, the frequency offset corrector 507 determines that a position of a predefined symbol is wrongly detected, or it is hard to perform high-reliability frequency detection because of a low SNR due to the bad channel condition. Then, in step 715, the frequency offset corrector 507 re-detects a predefined symbol transmitted after the currently tested predefined symbol, thereby re-performing the initial carrier frequency step.

However, if the value D is equal to '1' in step 707, the frequency offset corrector 507 can determine that FFO is in the vicinity of 0.5. According to an exemplary implementation, the frequency offset corrector 507 calculates a ratio v of the Max2 to the Max3 in step 711 in accordance with Equation (5), and determines whether the ratio v is greater than a predetermined second threshold.

$$v = \frac{\max 2}{\max 3} \qquad (5)$$

According to an exemplary implementation, the second threshold indicates T2 613 of FIG. 6B, and if the value v is greater than the T2 613, the frequency offset corrector 507 determines that the corresponding case as Case II. However, if the value v is less than the T2 613, the frequency offset corrector 507 determines that the corresponding case as Case III.

If the value v is greater than the second threshold T2 613 in step 711, determining that the corresponding case is Case II, the frequency offset corrector 507 sets in step 713 an estimated frequency offset value in accordance with Equation (6).

$$\hat{f}_n = \arg \left[ \max_{f_n} [Z(f_n)] \right] - \Delta \times D \qquad (6)$$

According to an exemplary implementation, $$\arg \left[ \max_{f_n} [Z(f_n)] \right]$$

denotes Offset1, and Δ denotes a parameter used for determining a residual carrier frequency offset and has a value between 0 and 1.

If the corresponding case is determined as Case II, the frequency offset corrector 507 performs an initial carrier frequency process in step 717 using the frequency offset value of Equation (6), determining that the FFO level is in the vicinity of 0.5. In Case II, the frequency offset corrector 507 performs a fine carrier frequency synchronization process taking FFO=0.5 into account, thereby reducing the convergence time. However, if the value v is less than the second threshold T2 613 in step 711, the frequency offset corrector 507 performs step 715, determining that the corresponding case is Case III.

In the frequency recovery process, according to an exemplary embodiment of the present invention, if the value v is set to '1', step 711 can be omitted because Max1 is always greater than Max2.

Because the value D in Equation (6) is '+1' or '−1', frequency offset correction is performed separately for one case in which FFO is in the vicinity of 0.5 and another case in which FFO is in the vicinity of −0.5. Because a frequency offset correction value Δ is a parameter used to determine a residual carrier frequency offset, it varies based upon a system. Since Δ is a parameter used for correcting the case in which the FFO is in the vicinity of 0.5, it is preferable to set Δ to a value approximating 0.5.

According to an exemplary implementation, where predefined symbols are transmitted at all OFDM symbols as in the DVB-H system in which pilots are transmitted at all OFDM symbols, the frequency offset corrector 507 outputs the estimated frequency offset value of Equation (2) and performs an initial carrier frequency synchronization process, determining that the SNR is low due to the bad channel condition if the corresponding case is Case III in step 711.

After performing the initial carrier frequency synchronization process, the frequency offset corrector 507 performs a fine carrier frequency synchronization process for correcting the residual frequency offset in step 717. In an exemplary embodiment of the present invention, the fine carrier frequency synchronization process can use the scheme using predefined symbols, and the blind scheme. As the predefined symbol, the pilot signal transmitted at a particular subcarrier is most popularly used, and the residual carrier frequency offset is estimated using a difference between pilot signals in the position of the same subcarriers transmitted over two consecutive OFDM symbols. For the blind scheme, a scheme using a cyclic prefix (CP) symbol is popularly used. The residual carrier frequency offset is estimated using the characteristic that a CP symbol in one OFDM symbol and a rear part of the OFDM symbol are equal to each other.

Figure 8:
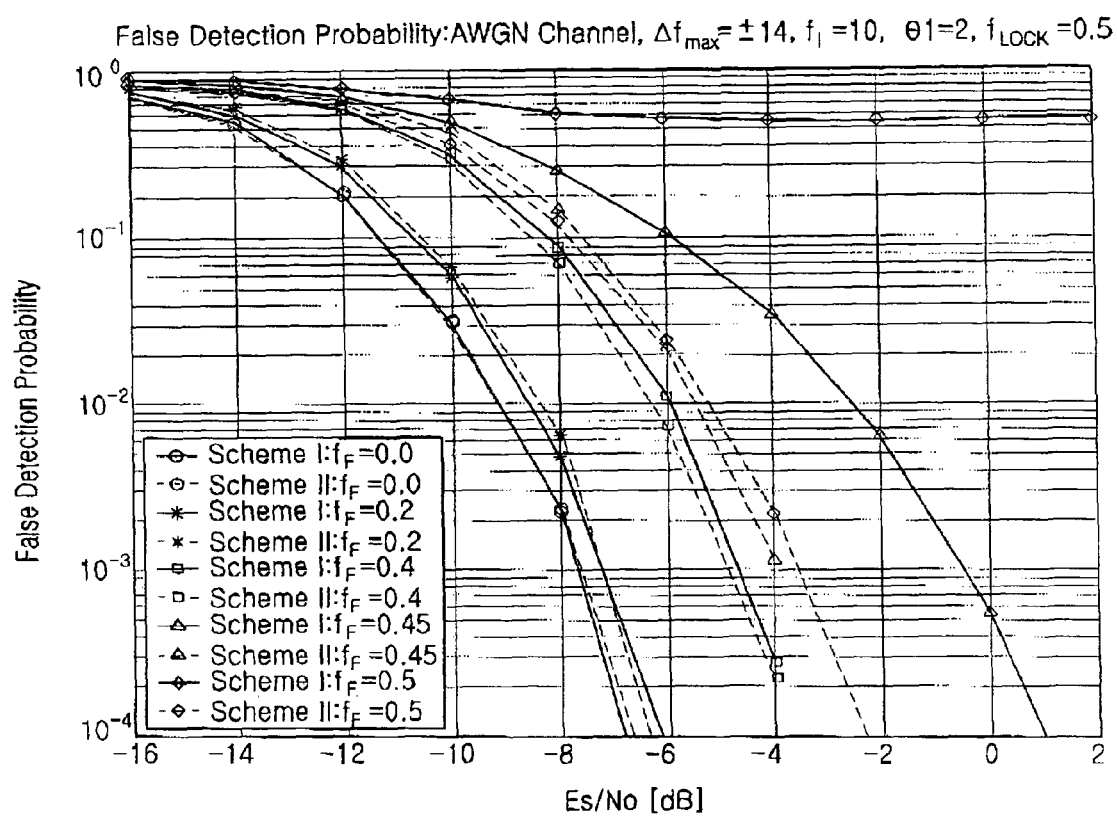
FIGS. 8 and 9 are graphs illustrating carrier frequency offset estimation performance according to an exemplary embodiment of the present invention.
Figure 9:
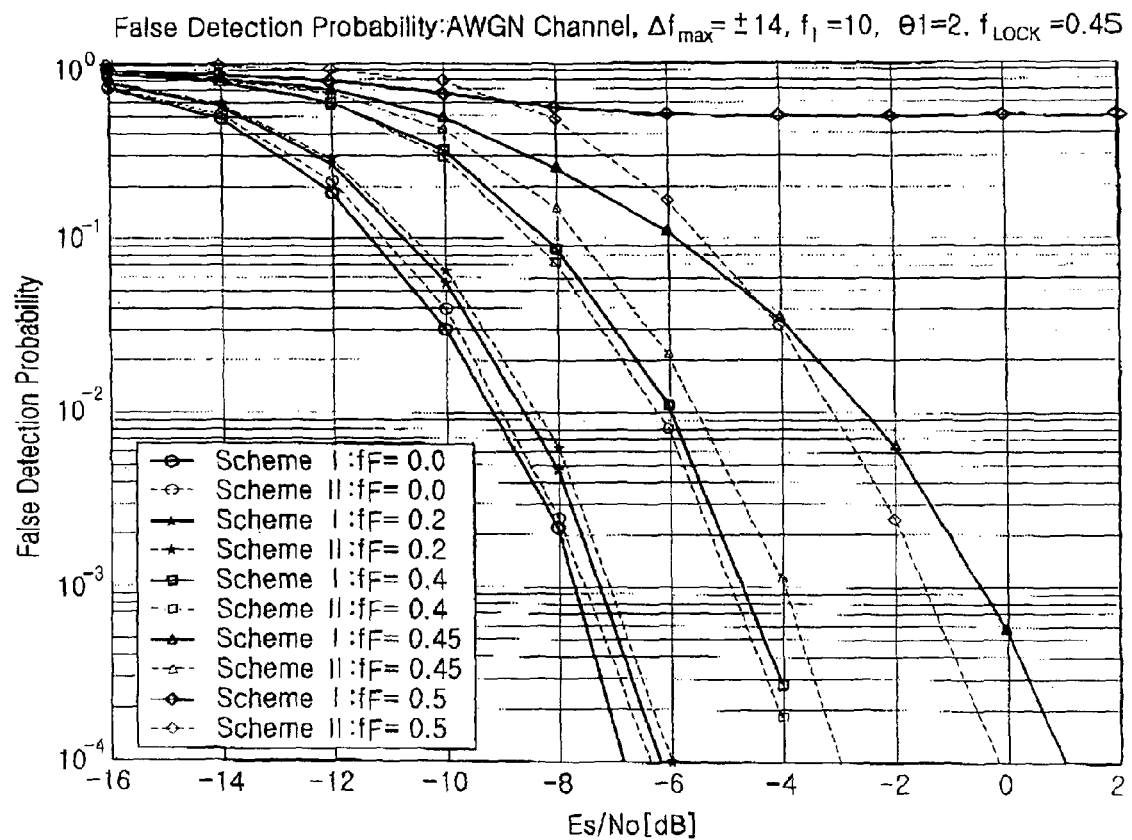

FIGS. 8 and 9 are graphs illustrating carrier frequency offset estimation performance according to an exemplary embodiment of the present invention. Specifically, FIGS. 8 and 9 illustrate SNR error probability. In the graphs, the horizontal axis represents SNR and the vertical axis represents error detection probability.

In FIG. 8, a detection criterion is set such that the residual carrier frequency offset becomes subcarrier spacing between −0.5 and 0.5. Compared with the conventional initial carrier frequency synchronization scheme, the novel initial carrier frequency synchronization scheme noticeably reduces the error detection probability for the case where FFO is in the vicinity of 0.5, thereby improving the detection performance.

FIG. 9 illustrates the case in which the detection criterion is set such that the residual carrier frequency offset becomes subcarrier spacing between −0.45 and 0.45. In this case, the hang-up phenomenon does not occur because error detection probability for the case where FFO is in the vicinity of 0.5 is remarkably reduced, but also because the residual carrier frequency offset after the initial carrier frequency offset correction is not in the vicinity of 0.5. Therefore, the time required for synchronization in the fine frequency correction step after the initial carrier frequency correction is reduced. In addition, because FIG. 9 is lower than FIG. 8 in terms of the error detection performance, there is a trade-off between the fine frequency correction time and the initial carrier frequency offset detection performance.

As can be understood from the foregoing description, the novel frequency recovery method adaptively corrects the initial carrier frequency offset value estimated for the case in which FFO is in the vicinity of 0.5, thereby increasing estimation performance compared with the conventional frequency recovery method, and further reducing a convergence time in the fine carrier frequency recovery process after the initial carrier frequency recovery. In addition, because the novel frequency recovery process needs only two comparison processes and one addition process, an increase in the hardware complexity is inconsiderable.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for recovering a carrier frequency of a received signal using a predefined symbol in an orthogonal frequency division multiplexing (OFDM) system, the method comprising the steps of:

detecting at least three auto-correlation values and their corresponding offsets in descending order among auto-correlation values calculated within a specific frequency offset range between a received signal and a predefined symbol;

comparing a ratio of a first auto-correlation value to a second auto-correlation value with a first threshold;

determining whether first and second frequency offsets corresponding to the first and second auto-correlation values are adjacent to each other if the ratio of the first and second auto-correlation values is less than the first threshold; and determining an initial carrier frequency offset using a difference between the first frequency offset and a frequency offset correction value determined according to the system, if the first and second frequency offsets are adjacent to each other and a ratio of the second auto-correlation value and a third auto-correlation value is greater than a second threshold;

wherein the first to third auto-correlation values represent the calculated auto-correlation values in descending order.

2. The method of claim 1, further comprising the step of performing initial carrier synchronization using the initial carrier frequency offset, and then performing fine carrier frequency synchronization using a residual carrier frequency offset.

3. The method of claim 1, further comprising the step of determining the first frequency offset as an initial carrier frequency offset, if the ratio of the first auto-correlation value to the second auto-correlation value is greater than the first threshold.

4. The method of claim 1, further comprising the step of re-performing an initial carrier frequency process if the first and second frequency offsets are not adjacent to each other.

5. The method of claim 1, further comprising the step of re-performing an initial carrier frequency process if the ratio of the second auto-correlation value to the third auto-correlation value is less than the second threshold.

6. The method of claim 1, wherein the initial carrier frequency offset is defined as $$\hat{f}_n = \arg\left[\max_1_{f_n} [Z(f_n)]\right] - \Delta \times D$$

where $$\arg\left[\max_1_{f_n} [Z(f_n)]\right]$$

denotes the first frequency offset, $\Delta$ denotes the frequency offset correction value, and D denotes a difference between the first frequency offset and the second frequency offset.

7. The method of claim 6, wherein the frequency offset correction value is in the vicinity of 0.5.

8. An apparatus for recovering a carrier frequency of a received signal using a predefined symbol in an orthogonal frequency division multiplexing (OFDM) system, the apparatus comprising:
a maximum value detector for detecting at least three auto-correlation values and their corresponding offsets in descending order among auto-correlation values calculated within a specific frequency offset range between a received signal and a predefined symbol; and
a frequency offset corrector for comparing a ratio of a first auto-correlation value to a second auto-correlation value with a first threshold, determining whether first and second frequency offsets corresponding to the first and second auto-correlation values are adjacent to each other if the ratio of the first and second auto-correlation values is less than the first threshold, and determining an initial carrier frequency offset using a difference between the first frequency offset and a frequency offset correction value determined according to system, if the first and second frequency offsets are adjacent to each other and a ratio of the second auto-correlation value and a third auto-correlation value is greater than a second threshold;
wherein the first to third auto-correlation values represent the calculated auto-correlation values in descending order.

9. The apparatus of claim 8, wherein the frequency offset corrector determines the first frequency offset as an initial carrier frequency offset, if the ratio of the first auto-correlation value to the second auto-correlation value is greater than the first threshold.

10. The apparatus of claim 8, wherein the frequency offset corrector re-performs an initial carrier frequency process if the first and second frequency offsets are not adjacent to each other.

11. The apparatus of claim 8, wherein the frequency offset corrector re-performs an initial carrier frequency process if the ratio of the second auto-correlation value to the third auto-correlation value is less than the second threshold.

12. The apparatus of claim 8, wherein the initial carrier frequency offset is defined as $$\hat{f}_n = \arg\left[\max_1_{f_n} [Z(f_n)]\right] - \Delta \times D$$

where $$\arg\left[\max_1_{f_n} [Z(f_n)]\right]$$

denotes the first frequency offset, $\Delta$ denotes the frequency offset correction value, and D denotes a difference between the first frequency offset and the second frequency offset.

13. The apparatus of claim 12, wherein the frequency offset correction value is in the vicinity of 0.5.

14. The method of claim 6, wherein the frequency offset correction value is at least 0.5.

15. The apparatus of claim 12, wherein the frequency offset correction value is at least 0.5.

16. An apparatus for recovering a carrier frequency of a received signal using a predefined symbol in an orthogonal frequency division multiplexing (OFDM) system, the apparatus comprising:
an auto-correlation level calculator for receiving an FFT output signal in a position of a predefined symbol and for calculating an auto-correlation value with a PN sequence;
a maximum value detector for detecting at least three auto-correlation values and their corresponding offsets in descending order among auto-correlation values calculated within a specific frequency offset range between a received signal and a predefined symbol; and
a frequency offset estimator for receiving a greatest maximum value (Max1) among the maximum values from the maximum value detector and for estimating a frequency offset for an Integer Frequency Offset (IFO);
a frequency offset corrector for comparing a ratio of a first auto-correlation value to a second auto-correlation value with a first threshold, determining whether first and second frequency offsets corresponding to the first and second auto-correlation values are adjacent to each other if the ratio of the first and second auto-correlation values is less than the first threshold, and determining an initial carrier frequency offset using a difference between the first frequency offset and a frequency offset correction value determined according to system, if the first and second frequency offsets are adjacent to each other and a ratio of the second auto-correlation value and a third auto-correlation value is greater than a second threshold;
wherein the first to third auto-correlation values represent the calculated auto-correlation values in descending order.

* * * * *